United States Patent
Khandekar et al.

(10) Patent No.: US 7,421,041 B2
(45) Date of Patent: Sep. 2, 2008

(54) ITERATIVE CHANNEL AND INTERFERENCE ESTIMATION AND DECODING

(75) Inventors: Aamod Khandekar, San Diego, CA (US); Avneesh Agrawal, San Diego, CA (US); Fuyun Ling, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 690 days.

(21) Appl. No.: 10/791,342

(22) Filed: Mar. 1, 2004

(65) Prior Publication Data

US 2005/0190868 A1 Sep. 1, 2005

(51) Int. Cl.
*H03K 9/00* (2006.01)
(52) U.S. Cl. .................................. 375/316; 375/345
(58) Field of Classification Search ................ 375/316, 375/345

See application file for complete search history.

(56) References Cited

U.S. PATENT DOCUMENTS

| 6,879,627 B1 * | 4/2005 | Davidson et al. ............. 375/222 |
| 2003/0031278 A1 * | 2/2003 | Kang et al. .................. 375/341 |

FOREIGN PATENT DOCUMENTS

| EP | 1217798 A2 | 12/2001 |
| WO | 0161952 A1 | 8/2001 |
| WO | 0169873 A2 | 9/2001 |

OTHER PUBLICATIONS

Yeap, B. L., "Comparative Study of Turbo Equalisers Using Convolutional Codes and Block-Based Turbo Codes for GMSK Modulation," IEEE, vol. 5, pp. 2974-2978, Sep. 19, 1999.

R. Michael Tanner, "Recursive Approach to Low Complexity Codes," IEEE Transactions on Info Theory, vol. IT-27, No. 5 (Sep. 1981).

Rza Nuriyev et al., "Analysis of Joint Iterative Decoding and Phase Estimation for the Non-Coherent AWGN Channel, Using Density Evolution" University of Michigan, Electrical Engineering and Computer Science Department.

H. Jin and T. J. Richardson, "Design of Low-Density Parity-Check Codes for Noncoherent MPSK Communication", Proc. Int. Symp. Information Theory, Lausanne, Switzerland, Jun. 2002, p. 169.

International Search Report - PCT/US2005/005907, International Search Authority - European Patent Office Jun. 20, 2005.

* cited by examiner

*Primary Examiner*—Kevin Kim
(74) *Attorney, Agent, or Firm*—Micky S. Minhas; Larry J. Moskowitz; Thomas Rouse

(57) ABSTRACT

For an iterative channel and interference estimation and decoding scheme, prior information for channel gain and interference is initially obtained based on received pilot symbols. Forward information for code bits corresponding to received data symbols is derived based on the received data symbols and the prior information and then decoded to obtain feedback information for the code bits corresponding to the received data symbols. A posteriori information for channel gain and interference for each received data symbol is derived based on the feedback information for that received data symbol. The a posteriori information for the received data symbols and the prior information are combined to obtain updated information for channel gain and interference for each received data symbol. The process can be repeated for any number of iterations. The prior, a posteriori, and updated information may be represented by joint probability distributions on channel gain and interference. The forward and feedback information may be represented by log-likelihood ratios.

50 Claims, 8 Drawing Sheets

ITERATIVE CHANNEL AND INTERFERENCE ESTIMATION AND DECODING

BACKGROUND

I. Field

The present invention relates generally to communication, and more specifically to techniques for recovering data in the presence of noise and interference at a receiver in a wireless communication system.

II. Background

In a wireless communication system, a transmitter typically encodes, interleaves, and modulates (i.e., symbol maps) traffic data to obtain data symbols, which are modulation symbols for data. For a coherent system, the transmitter multiplexes pilot symbols with the data symbols, processes the multiplexed pilot and data symbols to generate a modulated signal, and transmits the signal via a wireless channel. The channel distorts the transmitted signal with a channel response and further degrades the signal with noise and interference.

A receiver receives the transmitted signal and processes the received signal to obtain received symbols. For a coherent system, the receiver typically estimates the channel response with the received pilot symbols and performs coherent demodulation/detection of the received data symbols with the channel response estimates to obtain recovered data symbols, which are estimates of the data symbols transmitted by the transmitter. The receiver then symbol demaps, deinterleaves, and decodes the recovered data symbols to obtain decoded data, which is an estimate of the traffic data sent by the transmitter.

In a typical coherent wireless system, the receiver processes the received pilot symbols once to obtain the channel response estimates and also performs coherent demodulation once on the received data symbols to obtain the recovered data symbols. The receiver then performs symbol demapping, deinterleaving, and decoding on the recovered symbols in accordance with the coding and modulation schemes used for the traffic data. The noise and interference degrade the quality of the recovered data symbols and affect the reliability of the decoded data. There is therefore a need in the art for techniques to recover data in the presence of noise and interference at the receiver in a wireless communication system.

SUMMARY

Iterative receiver processing techniques that can account for interference and provide improved performance are provided herein. These techniques may be used for various wireless communication systems and may be implemented in various manners.

For an iterative channel and interference estimation and decoding scheme, channel gain and interference are iteratively estimated. For this scheme, prior information for channel gain and interference is initially obtained (e.g., based on received pilot symbols). Forward information for code bits corresponding to received data symbols is derived based on the received data symbols and the prior information. (Each data symbol is obtained based on B code bits, where B is dependent on the modulation scheme used for the data symbol.) The forward information is then decoded to obtain feedback information for the code bits corresponding to the received data symbols. A posteriori information for channel gain and interference for each received data symbol is derived based on the feedback information for the code bits corresponding to that received data symbol. The a posteriori information for all received data symbols and the prior information are combined to obtain updated information for channel gain and interference for each received data symbol. The process can be repeated for any number of iterations, with the updated information for channel gain and interference being used to derive the forward information for each subsequent iteration.

The prior information, a posteriori information, and updated information for channel gain and interference may be represented with joint probability distributions on channel gain and interference. The forward and feedback information may be represented by log-likelihood ratios (LLRs) for the code bits of the received data symbols.

In another iterative receiver processing scheme, interference is estimated once and used in the iterative channel estimation and decoding process. This can reduce computation complexity for the various steps of the iterative process.

For all iterative receiver processing schemes, complexity can be reduced by estimating channel magnitude non-iteratively (e.g., based on the received pilot and data symbols) and only estimating channel phase iteratively. To further reduce complexity when using an M-ary phase shift keying (M-PSK) modulation scheme, the channel phase may be estimated to within a range of 0 to $2\pi/M$ (e.g., based on the received data symbols). In this case, the prior information, a posteriori information, and updated information for channel gain can comprise M components for M different channel phase values, where M may be much fewer than the number of components needed without the initial channel phase estimate.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The iterative receiver processing techniques described herein may be used for various wireless communication systems that experience interference. For clarity, these techniques are described for a frequency hopping communication system in which data is transmitted on different frequency subbands in different time intervals, which are also referred to as "hop periods". With frequency hopping, a data transmission hops from subband to subband in a pseudo-random manner. This hopping provides frequency diversity and allows the data transmission to better withstand deleterious path effects such as narrow-band interference, jamming, fading, and so on.

The subbands in a frequency hopping system may be provided by orthogonal frequency division multiplexing (OFDM), other multi-carrier modulation techniques, or some other constructs. OFDM is a modulation technique that effectively partitions the overall system bandwidth into multiple ($N_F$) orthogonal subbands. Each subband is associated with a respective subcarrier that may be modulated with data. The subbands are also commonly referred to as tones, subcarriers, bins, and frequency channels A frequency hopping system may be deployed with multiple cells, where a cell typically refers to a base station and/or its coverage area. Each cell can support multiple users simultaneously. For a given cell, the data for each user in the cell may be transmitted using a specific frequency hopping (FH) sequence assigned to the user. The FH sequence indicates the specific subband to use for data transmission in each hop period. Multiple data transmissions for multiple users may be sent simultaneously using different FH sequences. These FH sequences are defined to be orthogonal to one another so that only one data transmission uses each subband in each hop period. By using orthogonal FH sequences, the data transmissions for multiple users in the same cell do not interfere with one another while enjoying the benefits of frequency diversity. However, these users typically experience inter-cell interference from users in other cells. The interference observed by a given user can vary from hop to hop because different interfering users may be observed in different hops.

Figure 1:
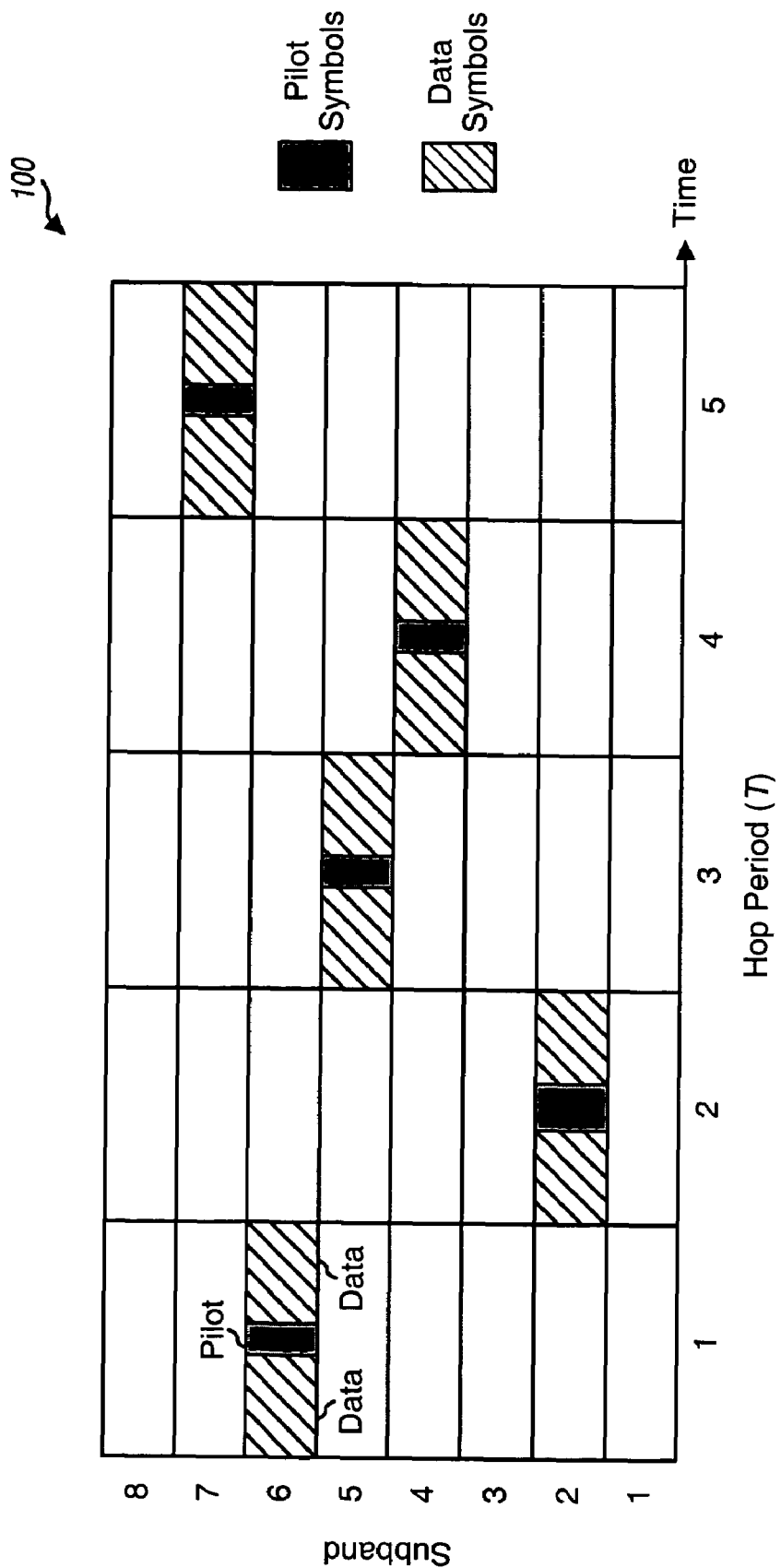
FIG. 1 shows a transmission scheme for a frequency hopping system.

FIG. 1 shows an exemplary transmission scheme 100 for a frequency hopping communication system. FIG. 1 shows pilot and data transmission on a frequency-time plane in which the vertical axis represents frequency and the horizontal axis represents time. For this example, $N_F=8$ and the eight subbands are assigned indices of 1 through 8. Up to eight traffic channels may be defined whereby each traffic channel uses one of the eight subbands in each hop period. A hop period is the time duration spent on a given subband and may be defined to be equal to the duration of $N_H$ OFDM symbols, where $N_H \geq 1$.

Each traffic channel is associated with a different FH sequence. The FH sequences for all traffic channels may be generated with an FH function $f(k,T)$, where k denotes the traffic channel number and T denotes system time, which is given in units of hop periods. $N_F$ different FH sequences may be generated with $N_F$ different values of k for the FH function $f(k,T)$. The FH sequence for each traffic channel indicates the particular subband to use for that traffic channel in each hop period. For clarity, FIG. 1 shows the subbands used for one traffic channel. This traffic channel hops from subband to subband in a pseudo-random manner determined by its FH sequence.

For transmission scheme 100, $N_P$ pilot symbols (depicted as a solid box) are transmitted in a time division multiplexed (TDM) manner with $N_D$ data symbols (depicted as hashed boxes) in each hop period. In general, $N_P \geq 1$, $N_D \geq 1$, and $N_P+N_D=N_H$. $N_P$ is typically a sufficient number of pilot symbols to allow a receiver to adequately estimate the channel response in each hop period.

Figure 2:
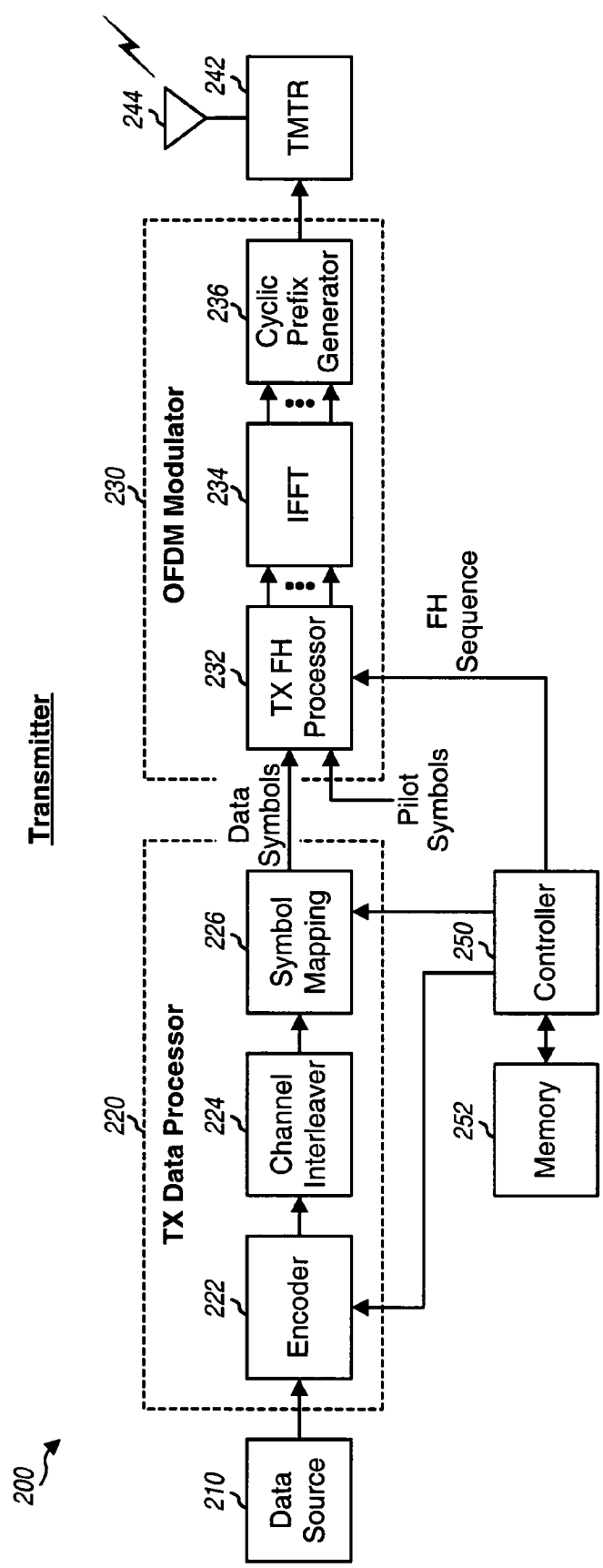
FIG. 2 shows a transmitter in the frequency hopping system.

FIG. 2 shows a block diagram of a transmitter 200 in the frequency hopping system. A transmit (TX) data processor 220 receives traffic data from a data source 210 and control data from a controller 250. Within TX data processor 220, an encoder 222 encodes the traffic and control data in accordance with a selected coding scheme (e.g., a convolutional code, a low density parity check (LDPC) code, a Turbo code, a block code, and so on) to obtain coded data. The encoding increases the reliability of the data transmission. A channel interleaver 224 interleaves (i.e., reorders) the coded data to obtain interleaved data. The interleaving provides diversity for the coded data. A symbol mapping unit 226 then symbol maps (i.e., modulates) the interleaved data in accordance with a selected modulation scheme to obtain data symbols. The selected modulation scheme may be M-PSK (e.g., BPSK or QPSK), M-ary quadrature amplitude modulation (M-QAM), or some other modulation scheme. The symbol mapping may be performed by (1) grouping sets of B interleaved bits to form B-bit binary values, where $B \geq 1$ and $2^B=M$, and (2) mapping each B-bit binary value to a point in a signal constellation corresponding to the selected modulation scheme. Each mapped signal point is a complex value and corresponds to a modulation symbol (i.e., a data symbol). Symbol mapping unit 226 provides a stream of data symbols to an OFDM modulator 230.

OFDM modulator 230 performs frequency hopping and OFDM modulation for the data and pilot symbols. Within OFDM modulator 230, a TX FH processor 232 receives the data and pilot symbols and provides these symbols on the proper subband (and in the proper order) in each hop period, as indicated by an FH sequence from controller 250. The data and pilot symbols dynamically hop from subband to subband in a pseudo-random manner determined by the FH sequence. TX FH processor 232 provides $N_F$ "transmit" symbols for the $N_F$ subbands for each OFDM symbol period. These $N_F$ transmit symbols are composed of one data/pilot symbol for each subband used for data/pilot transmission and a signal value of zero for each subband not used for data/pilot transmission.

An inverse fast Fourier transform (IFFT) unit 234 receives the $N_F$ transmit symbols for each OFDM symbol period, performs an $N_F$-point inverse fast Fourier transform on the $N_F$ transmit symbols, and provides a corresponding "transformed" symbol that contains $N_F$ time-domain chips. Each chip is a complex value to be transmitted in one chip period, where the chip rate is typically determined by the system bandwidth. A cyclic prefix generator 236 receives the $N_F$ chips for each transformed symbol and repeats a portion of the transformed symbol to form an OFDM symbol that contains $N_F+N_{cp}$ chips, where $N_{cp}$ is the number of chips being repeated. The repeated portion is often referred to as a cyclic prefix and is used to combat inter-symbol interference (ISI) caused by a dispersive wireless channel (i.e., a wireless channel with time delay spread). An OFDM symbol period is the duration of one OFDM symbol, which is $N_F+N_{cp}$ chip periods. Cyclic prefix generator 236 provides a stream of OFDM symbols. A transmitter unit (TMTR) 242 conditions (e.g., converts to analog signals, filters, amplifies, and frequency upconverts) the stream of OFDM symbols to generate a modulated signal, which is transmitted from an antenna 244.

Figure 3:
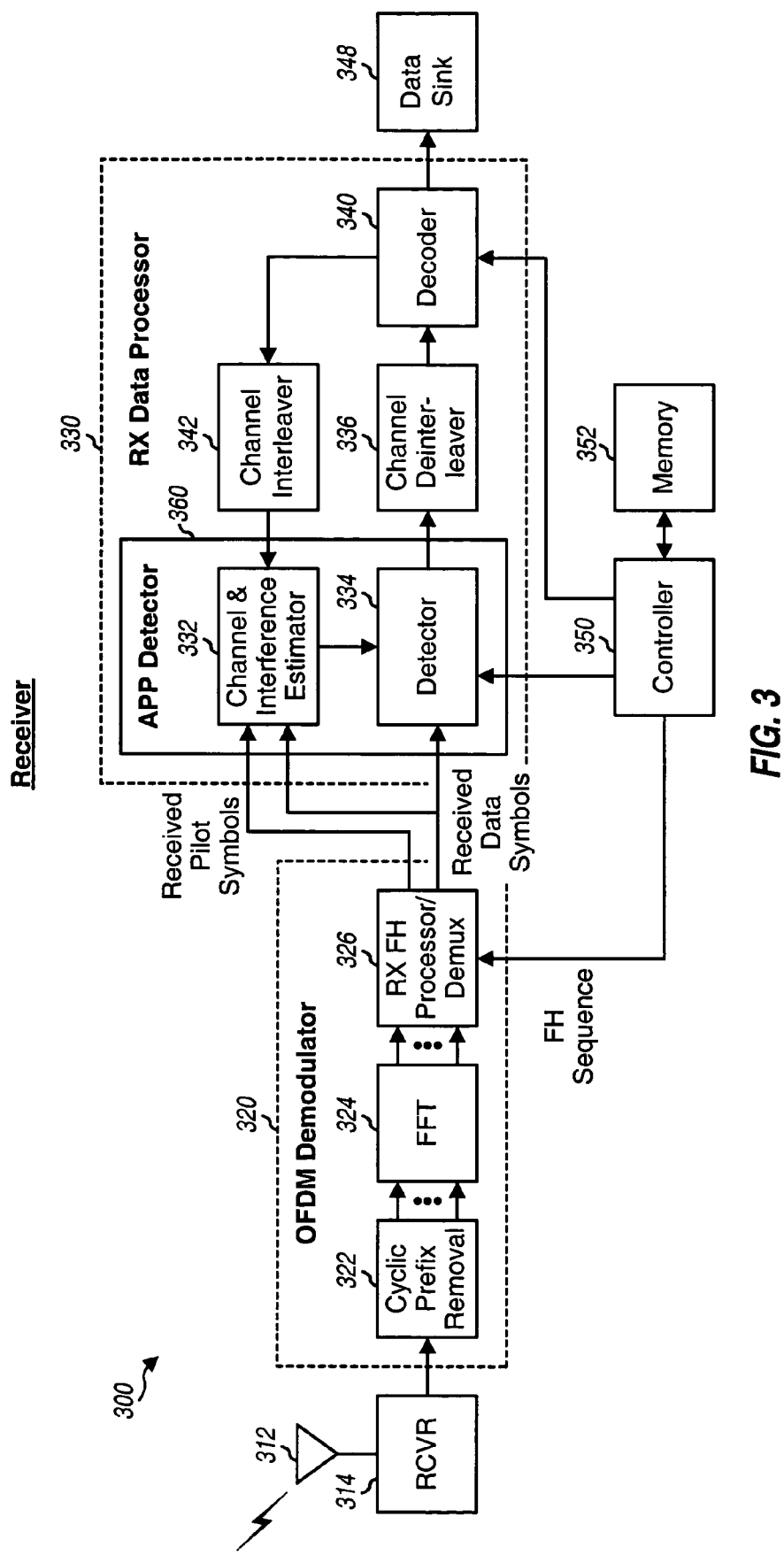
FIG. 3 shows a receiver in the frequency hopping system.

FIG. 3 shows a block diagram of a receiver 300 in the frequency hopping system. An antenna 312 receives the modulated signal transmitted by transmitter 200 and provides the received signal to a receiver unit (RCVR) 314. Receiver unit 314 conditions (e.g., frequency downconverts, filters, and amplifies) the received signal and further digitizes the conditioned signal to obtain a stream of samples, which is provided to an OFDM demodulator 320.

Within OFDM demodulator 320, a cyclic prefix removal unit 322 receives the stream of samples, removes the cyclic prefix appended to each received OFDM symbol, and provides a corresponding received transformed symbol that contains $N_F$ samples. An FFT unit 324 performs an $N_F$-point FFT on the $N_F$ samples for each received transformed symbol to obtain $N_F$ received symbols for the $N_F$ subbands for that transformed symbol. An RX FH processor/demultiplexer 326 obtains the $N_F$ received symbols for each OFDM symbol period and provides the received symbol from the proper subband as the received data/pilot symbol for that OFDM symbol period. The proper subband is determined by an FH sequence from a controller 350. The FH sequence used for RX FH processor 326 at receiver 300 is the same as, and synchronized to, the FH sequence used by TX FH processor 232 at transmitter 200. RX FH processor 326 operates in unison with TX FH processor 232 and provides a stream of received data/pilot symbols from the proper subbands to a receive (RX) data processor 330.

RX data processor 330 performs iterative receiver processing on the received data and pilot symbols to obtain decoded data. For the embodiment shown in FIG. 3, RX data processor 330 includes a channel and interference estimator 332, a detector 334, a channel deinterleaver 336, a decoder 340, and a channel interleaver 342 that operate as described below. RX data processor 330 provides the decoded data to a data sink 348 and/or controller 350.

Controllers 250 and 350 direct operation at transmitter 200 and receiver 300, respectively. Memory units 252 and 352 provide storage for program codes and data used by controllers 250 and 350, respectively.

The model for the frequency hopping system may be expressed as:

$$r_k(m) = s_k(m) \cdot h_k(m) + n_k(m), \quad \text{Eq (1)}$$
$$= s_k(m) \cdot a_k(m) e^{j\theta_k(m)} + n_k(m),$$

where $s_k(m)$ is the data or pilot symbol transmitted on subband k in symbol period m;
  $h_k(m)$ is the complex channel gain for subband k in symbol period m, which can be decomposed into a channel magnitude $a_k(m)$ and a channel phase $\theta_k(m)$;
  $r_k(m)$ is the received data or pilot symbol on subband k in symbol period m; and
  $n_k(m)$ is the noise and interference received on subband k in symbol period m.

For simplicity, the channel magnitude $a_k(m)=|h_k(m)|$ is assumed to be known by the receiver and only the channel phase $\theta_k(m)$ needs to be estimated. For a constant energy modulation scheme such as M-PSK, the magnitude of data and pilot symbols received in each hop period can be averaged to obtain a reasonably accurate estimate of the channel magnitude $a_k(m)$ for that hop period. Thus, in the following description, the channel gain can be sufficiently characterized by just the channel phase. (However, the diagrams show the more general case in which the channel gain can be a complex value with unknown magnitude and phase.)

The receiver may utilize non-iterative or iterative receiver processing to recover the transmitted data. For a non-iterative scheme, the channel response is estimated based on the received pilot symbols, and the received data symbols $r_k(m)$ are coherently demodulated or "detected" with the channel response estimate to obtain recovered data symbols $\hat{s}_k(m)$, which are estimates of the transmitted data symbols $s_k(m)$. The detection is performed once for the non-iterative scheme. The recovered data symbols are then deinterleaved and decoded to obtain decoded data. For an iterative scheme, the channel estimation, detection, and decoding are performed for multiple iterations. The iterative scheme exploits the error correction capabilities of the coding scheme to provide improved performance. This is achieved by iteratively passing information between a channel estimator, a detector, and a decoder for multiple iterations, as described below.

Figure 4:
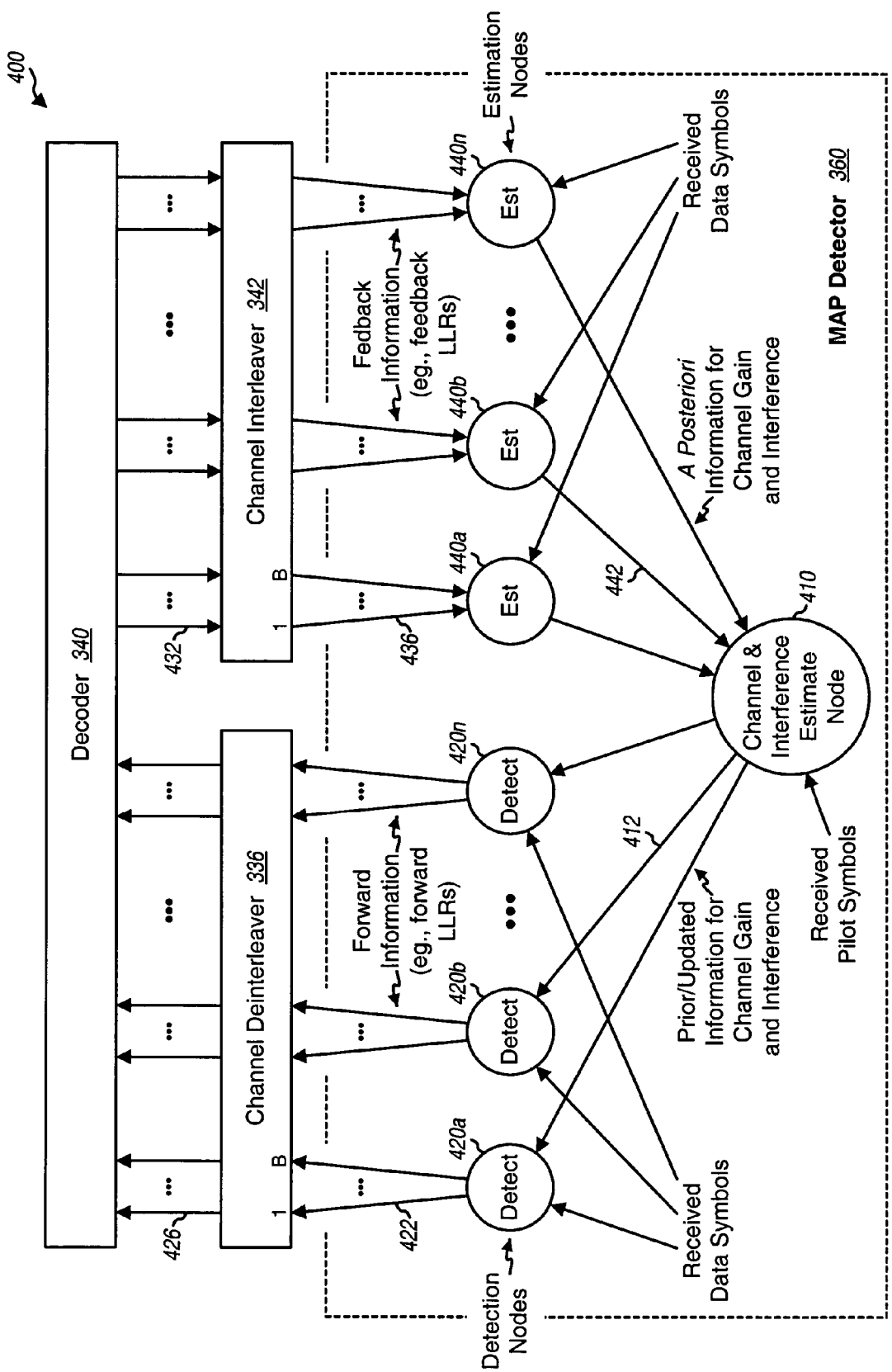
FIG. 4 shows a Tanner graph that graphically illustrates iterative channel and interference estimation and decoding.

FIG. 4 shows a Tanner graph 400 that graphically illustrates an iterative channel and interference estimation and decoding scheme. Iterative receiver processing is performed on a block of data symbols that, in general, can contain any number of data symbols. For clarity, the iterative receiver processing is described below for a block of $N_D$ received data symbols for one hop period. The $N_D$ received data symbols are formed by $N_B$ code bits, where $N_B = B \cdot N_D$.

Tanner graph 400 includes a channel and interference estimate node 410, $N_D$ detection nodes 420a through 420n for $N_D$ data symbols in the block, channel deinterleaver 336, channel interleaver 342, decoder 340, and $N_D$ estimation nodes 440a through 440n for the $N_D$ data symbols. Node 410 couples to each detection node 420 via a respective link 412 and to each estimation node 440 via a respective link 442. Each of links 412 and 442 carries information regarding the channel gain and interference for the data symbol associated with that link. Each detection node 420 couples to channel deinterleaver 336 via B links 422, and each estimation node 440 couples to channel interleaver 342 via B links 436. Decoder 340 couples to channel deinterleaver 336 via $N_B$ links 426 and to channel interleaver 342 via $N_B$ links 432. Each of links 422, 426, 432 and 436 carries information (in the direction indicated by the link) for a code bit associated with that link. The information for each code bit is typically in the form of a log-likelihood ratio (LLR), which indicates the likelihood of the code bit being a one ("1") or a zero ("0").

For the first iteration, node 410 obtains estimates of the channel gain based on the received pilot symbols. Node 410 estimates only the channel phase if the channel magnitude is known. Node 410 also estimates the interference observed by the received data symbols based on the received pilot symbols. Node 410 provides "prior" information for channel phase and interference to each detection node 420 via link 412.

Each detection node 420 obtains a respective received data symbol $r_k(n)$ and the prior information for channel phase and interference from node 410. Each detection node 420 computes the LLR for each of the B code bits that forms its data symbol based on the received data symbol $r_k(n)$ and the prior information for channel phase and interference. Each detection node 420 provides B "forward" LLRs for the B code bits to channel deinterleaver 336 via links 422. Channel deinterleaver 336 deinterleaves the forward LLRs for all $N_B$ code bits in a manner complementary to the interleaving performed at the transmitter and provides deinterleaved forward LLRs to decoder 340.

Decoder 340 decodes the deinterleaved forward LLRs for the $N_B$ code bits in accordance with the coding scheme used by the transmitter. For example, decoder 340 may implement (1) a maximum a posteriori (MAP) algorithm or a soft-output Viterbi (SOV) algorithm if the transmitter uses a convolutional code or (2) a Turbo/LDPC decoder if the transmitter uses a Turbo or an LDPC code. Decoder 340 provides feedback LLRs for the $N_B$ code bits, which are updated LLRs for these bits, to channel interleaver 342 via links 432. Channel interleaver 342 interleaves the feedback LLRs in the same manner as the interleaving performed at the transmitter and provides interleaved feedback LLRs to estimation nodes 440 via links 436.

Each estimation node 440 obtains a respective received data symbol $r_k(n)$ and the interleaved feedback LLRs for the B code bits of that received data symbol from channel interleaver 342. Each estimation node 440 derives "a posteriori" information for channel phase and interference for its data symbol based on the received data symbol $r_k(n)$ and the feedback LLRs and provides this a posteriori information to node 410 via link 442.

Node 410 combines the prior information for channel gain and interference and the a posteriori information for channel phase and interference from estimation nodes 440 to obtain updated information for channel gain and interference for each received data symbol. Node 410 provides the updated information for channel phase and interference to each detection node 420. The detection and decoding for the second iteration are then performed in similar manner as for the first iteration, albeit with the updated information for channel gain and interference.

In FIG. 4, each detection node 420 derives and provides "forward" information for the code bits corresponding to a respective received data symbol, and decoder 340 derives and provides "feedback" information for each received data symbol. The forward and feedback information is typically given in the form of LLRs, but may also be given in other forms.

Figure 5:
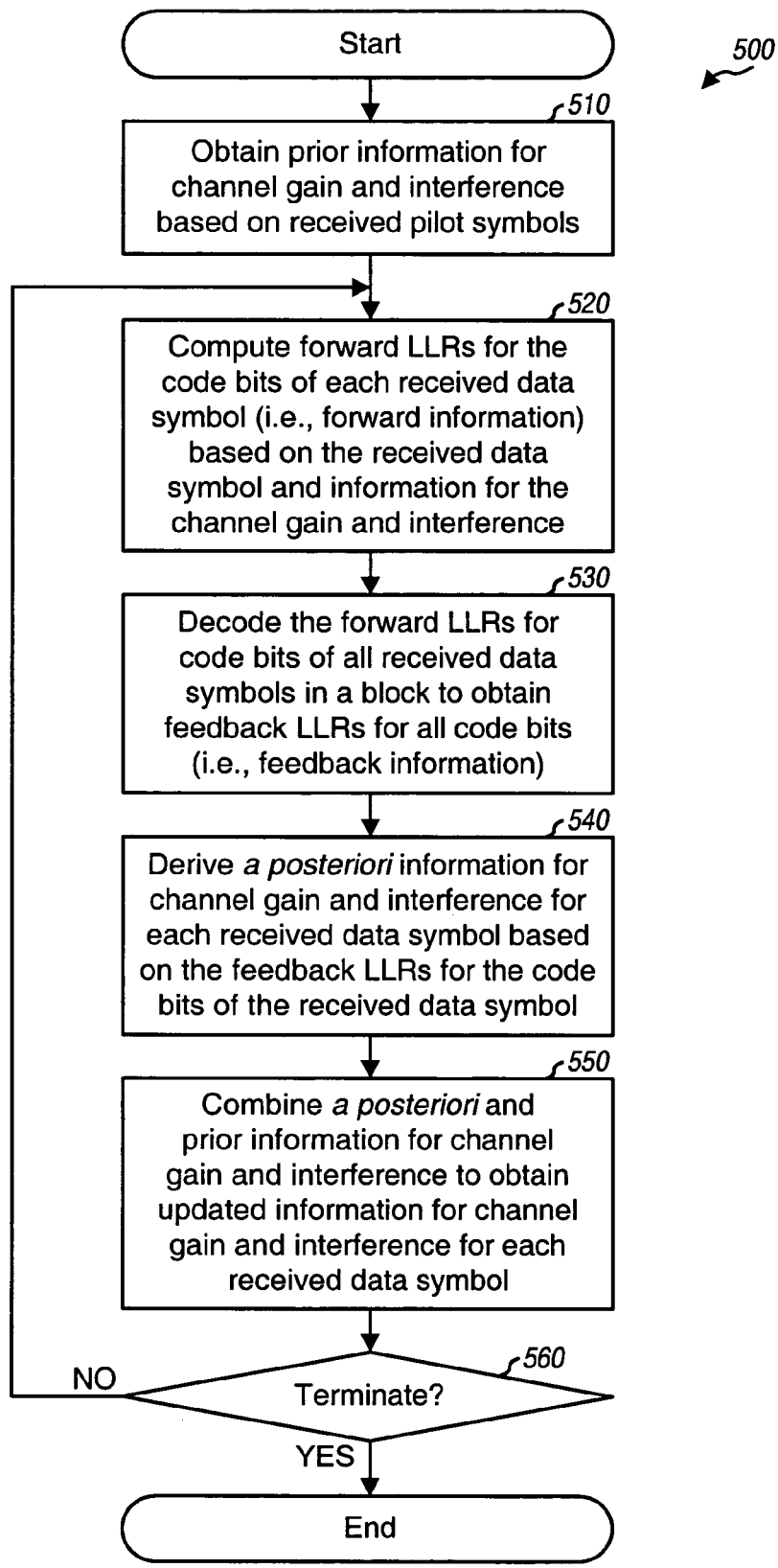
FIG. 5 shows a process for performing iterative channel and interference estimation and decoding.

FIG. 5 shows a flow diagram of a process 500 for performing iterative channel and interference estimation and decoding.

In step 510, prior information for channel phase and interference is obtained based on the received pilot symbols. Step 510 is performed by node 410 in FIG. 4. Again, the channel magnitude is assumed to be known and only the channel phase is estimated. The normalized channel observation for the pilot symbols may be expressed as:

$$h = a \cdot e^{j\theta} + n, \qquad \text{Eq (2)}$$

where the channel gain a and channel phase $\theta$ are assumed to be constant for all $N_D$ data symbols in the block and the noise and interference n is assumed to be a complex Gaussian random variable with zero mean and a variance of $N_0$.

The prior information for channel phase and interference can be given as a joint probability distribution on channel phase $\theta$ and interference power I. For simplicity, the channel phase $\theta$ may be quantized to L possible values and given in integer multiple of $2\pi/L$. Similarly, the interference power I may be quantized to Q possible values. The joint probability distribution on $\theta$ and I may be viewed as a three-dimensional (3-D) graph with the x-axis representing the channel phase $\theta$, the y-axis representing the interference power I, and the z-axis representing the joint probability of a particular channel phase $\theta_0$ and a particular interference power $I_0$ given a particular received pilot symbol. The joint probability distribution on $\theta$ and I may be expressed as:

$$Pr(\theta = \theta_0, I = I_0 \mid \tilde{p}) = \frac{Pr(\theta = \theta_0, I = I_0) \cdot Pr(\tilde{p} \mid \theta = \theta_0, I = I_0)}{Pr(\tilde{p})} \qquad \text{Eq (3)}$$

$$\propto Pr(I = I_0) Pr(\tilde{p} \mid \theta = \theta_0, I = I_0)$$

$$= Pr(I = I_0) \cdot \frac{1}{\sqrt{\pi I_0}} \exp\left(-\frac{|\tilde{p} - p \cdot a \cdot e^{j\theta_0}|^2}{I_0}\right),$$

where $\tilde{p}$ is the received pilot symbol and p is the actual pilot symbol;

Pr($\theta=\theta_0, I=I_0 | \tilde{p}$) is the joint probability distribution on $\theta$ and I, which gives the probability of the channel phase being $\theta_0$ and the interference power being $I_0$ given the received pilot symbol $\tilde{p}$;

Pr($\theta=\theta_0, I=I_0$) is an a priori joint probability distribution on $\theta$ and I, which gives the probability of the channel phase being $\theta_0$ and the interference power being $I_0$;

Pr($\tilde{p}|\theta=\theta_0, I=I_0$) is a probability distribution (obtained based on a communication channel model, e.g., Gaussian) that gives the probability of obtaining the received pilot symbol $\tilde{p}$ for a given channel phase $\theta_0$ and interference power $I_0$;

Pr($\tilde{p}$) is the probability of obtaining a given value of $\tilde{p}$; and Pr(I=$I_0$) is an a priori probability distribution on I, which gives the probability of the interference power being $I_0$.

The first expression in equation set (3) is obtained based on Bayes' rule. The second expression in equation set (3) is obtained with the assumption that different values of channel phase $\theta$ are a priori equiprobable, so that Pr($\theta=\theta_0$) is a constant and can be omitted. The third expression in equation (3) is obtained based on the assumption that the noise and interference is a complex Gaussian random variable with zero mean and variance of $I_0$. Equation set (3) omits a normalization factor that can be computed by applying the constraint that a probability distribution function (pdf) integrates to one over its domain.

One joint probability distribution on $\theta$ and I is obtained for each received pilot symbol, as shown in equation set (3). If multiple received pilot symbols are available, then multiple joint probability distributions on $\theta$ and I are obtained for these symbols and combined to obtain one overall or composite joint probability distribution on $\theta$ and I for all received pilot symbols. Step 510 provides one joint probability distribution on $\theta$ and I for use by all $N_D$ received data symbols. This joint probability distribution contains L·Q probability values for L different channel phase values and Q different interference power values, which may be viewed as a 3-D graph for probability versus $\theta$ and I. This joint probability distribution represents prior information for channel phase and interference obtained based on the received pilot symbols.

The probabilities for the joint distribution Pr($\theta=\theta_0, I=I_0|\tilde{p}$) may be expressed in the log-domain to simplify subsequent computation. This is similar to the use of log-likelihood ratio (LLR) to express the probability distribution of a single code bit. The use of log-domain representation for probabilities avoids the need to compute the outer exponential in the third expression of equation set (3).

The joint probability distribution on $\theta$ and I is obtained based on two variables $\theta$ and I that are a priori independent. The joint distribution is thus a product distribution of a distribution on $\theta$ and a distribution on I. The distribution on $\theta$ may be assumed to be uniform. The distribution on I (i.e., the interference power distribution) may be derived in various manners. In one embodiment, the interference power is assumed to be uniform over Q values. In another embodiment, the interference power is assumed to have a standard distribution such as a Gaussian distribution or a log-normal distribution. In yet another embodiment, the interference power distribution is obtained based on network-level computer simulation, empirical measurements, or by other means.

In step 520, the forward LLRs for the B code bits of each received data symbol are computed based on the received data symbol and the joint probability distribution on $\theta$ and I for that symbol. Step 520 is performed by each detection node 420 in FIG. 4. The forward LLR computation for each detection node 420 may be performed in two steps. In the first step, an a posteriori distribution on the value of the transmitted data symbol, x, is computed based on the received data symbol r and the joint probability distribution on $\theta$ and I. A data symbol can take on one of $M=2^B$ possible values. This a posteriori distribution indicates the probability for each of the M possible values of x given the received data symbol r and the joint probability distribution on θ and I. The a posteriori distribution on x given r may be expressed as:

$$Pr(x = x_0 \mid r) \propto Pr(r \mid x = x_0), = \sum_{i=1}^{L} \sum_{j=1}^{Q} Pr(\theta = \theta_i, I = I_j) \cdot Pr(r \mid x = x_0, \theta = \theta_i, I = I_j), \quad \text{Eq (4)}$$

where x is the data symbol value and can take on M possible values;
  Pr $(x=x_0|r)$ is the a posteriori distribution on x given r, which gives the probability of the data symbol value being $x_0$ given the received data symbol r;
  $Pr(r|x=x_0)$ is a distribution that gives the probability of obtaining received data symbol r given the data symbol value being $x_0$;
  $Pr(\theta=\theta_i, I=I_j)$ is the joint distribution on θ and I from the channel and interference estimation; and
  $Pr(r|x=x_0, \theta=\theta_i, I=I_j)$ is a complex Gaussian distribution with a mean of $x_0 a e^{j\theta_i}$ and variance of $I_j$.

The a posteriori distribution on x given r, Pr $(x=x_0|r)$, may be viewed as a 2-D graph that contains M probability values for M values of x corresponding to the received data symbol r.

In the second step for computing the forward LLRs, the a posteriori distribution on x for the received data symbol is "marginalized" to obtain the forward LLRs for the B code bits of that symbol. The data symbol value x is determined by the values of the B code bits and the signal constellation used to map code bits to data symbols. Each of the M possible values of x corresponds to a different combination of values for the B code bits. The forward LLR for each code bit can be computed as a weighted sum of the M probability values for the M possible values of x, where the weighting is determined by the distance between the data symbol in the signal constellation (or constellation symbol) and the received data symbol. Step 520 provides B forward LLRs for the B code bits of each received data symbol, or a total of $N_B$ forward LLRs for the $N_B$ code bits of the $N_D$ data symbols being processed iteratively. The forward LLRs represent forward information provided to the decoder.

In step 530, the forward LLRs for a codeword that contains the $N_B$ code bits are decoded to obtain feedback LLRs for the $N_B$ code bits. Step 530 is performed by decoder 340 in FIG. 4. The decoding may be performed based on, for example, a MAP, SOV, or Turbo decoding algorithm, and may be performed for one or multiple iterations. Step 530 provides $N_B$ feedback LLRs for the $N_B$ code bits, which represent feedback information provided by the decoder.

In step 540, an a posteriori joint probability distribution on θ and I is computed for each received data symbol based on the feedback LLRs for the B code bits of that data symbol, as follows:

$$Pr(\theta = \theta_0, I = I_0 \mid r) \propto Pr(I = I_0) \cdot Pr(r \mid \theta = \theta_0, I = I_0), \quad \text{Eq (5)}$$

$$= Pr(I = I_0) \cdot \sum_{i=1}^{M} Pr(x = x_i) \cdot Pr(r \mid x = x_i, \theta = \theta_0, I = I_0),$$

where $Pr(\theta=\theta_0, I=I_0|r)$ is the a posteriori joint probability distribution on θ and I, which provides the probability of the channel phase being $\theta_0$ and the interference power being $I_0$ given the received data symbol r;
  $Pr(x=x_i)$ is a product distribution on the data symbol value x, which can be obtained from the feedback LLRs for the B code bits of the received data symbol r; and
  $Pr(r|x=x_i, \theta=\theta_0, I=I_0)$ is a complex Gaussian random distribution with a mean of $x_i \cdot a \cdot e^{j\theta_0}$ and variance of $I_0$.

Step 540 is performed by each estimation node 440 in FIG. 4. The a posteriori joint probability distribution on θ and I given r is similar to the prior joint probability distribution on θ and I given $\tilde{p}$ computed in step 510. However, the a posteriori joint probability distribution is computed based on the feedback LLRs whereas the prior joint probability distribution is computed based on the received pilot symbol. Step 540 provides $N_D$ joint probability distributions on θ and I for $N_D$ received data symbols.

In step 550, the various joint probability distributions on θ and I are combined to obtain updated joint probability distributions on θ and I for the $N_D$ received data symbols. Step 550 is performed by node 410 in FIG. 4. For step 550, $N_D$ a posteriori joint probability distributions on θ and I for the $N_D$ received data symbols are available from step 540 and one prior joint probability distribution on θ and I is available from step 510. These $N_D+1$ distributions on θ and I are used to derive $N_D$ updated distributions on θ and I for the $N_D$ received data symbols. To avoid positive feedback, only extrinsic information is used to derive the updated distribution on θ and I for each detection node 420. The extrinsic information for a data symbol excludes information derived based on that data symbol. The updated distribution on θ and I for each received data symbol r is thus derived based on (1) $N_D-1$ a posteriori distributions on θ and I obtained for the other $N_D-1$ received data symbols and (2) the prior distribution on θ and I obtained from the received pilot symbols. This computation (1) effectively replaces the a posteriori distribution on θ and I obtained for received data symbol r with a uniform distribution and (2) assumes that the $N_D-1$ a posteriori distributions on θ and I for the other $N_D-1$ received data symbols are obtained based on independent pieces of information.

As an example, suppose that two distributions on θ and I, namely $Pr(\theta=\theta_0, I=I_0|\alpha)$ and $Pr(\theta=\theta_0, I=I_0|\beta)$, are to be combined, where α and β are independent random variables when conditioned on θ and I. The composite distribution may be expressed as:

$$Pr(\theta = \theta_0, I = I_0 \mid \alpha, \beta) \propto Pr(\alpha, \beta \mid \theta = \theta_0, I = I_0) \quad \text{Eq (6)}$$
$$= Pr(\alpha \mid \theta = \theta_0, I = I_0) \cdot$$
$$Pr(\beta \mid \theta = \theta_0, I = I_0)$$
$$\propto Pr(\theta = \theta_0, I = I_0 \mid \alpha) \cdot$$
$$Pr(\theta = \theta_0, I = I_0 \mid \beta).$$

The computation in equation (6) may be extended so that any number of distributions on θ and I can be combined. Step 550 provides $N_D$ updated joint probability distributions on θ and I for the $N_D$ received data symbols, which are used by detection nodes 420 to update the forward LLRs in the next iteration. Step 550 concludes one complete iteration of the joint channel and interference estimation and decoding.

In step 560, a determination is made whether or not to terminate the iterative channel gain and interference estimation and decoding. This decision may be made based on one or more termination criteria. For example, a termination criterion may be as simple as a predetermined number of iterations. If the answer is 'no' for step 560, then the process returns to step 520 to update the forward LLRs for the code bits. Otherwise, the process terminates. Step 560 may be performed after step 530, so that steps 540 and 550 can be omitted for the last iteration.

For simplicity, the computation of probability distribution is explicitly shown only for equation (1) and is omitted for all other equations. The computation of the various probability distributions described herein is known in the art.

The number of values taken by channel phase and interference determine the computational complexity of the various steps in FIG. 5. Since each joint probability distribution on $\theta$ and I contains $L \cdot Q$ probability values, the computation complexity is proportional to both L and Q, which are the number of quantized values for channel phase and interference, respectively. To maintain reasonable complexity, interference may be quantized to a low resolution with a small number of values. A technique to reduce the number of channel phase values is described below. Complexity can also be reduced by using channel phase and interference in other manners, as described below.

Figure 6:
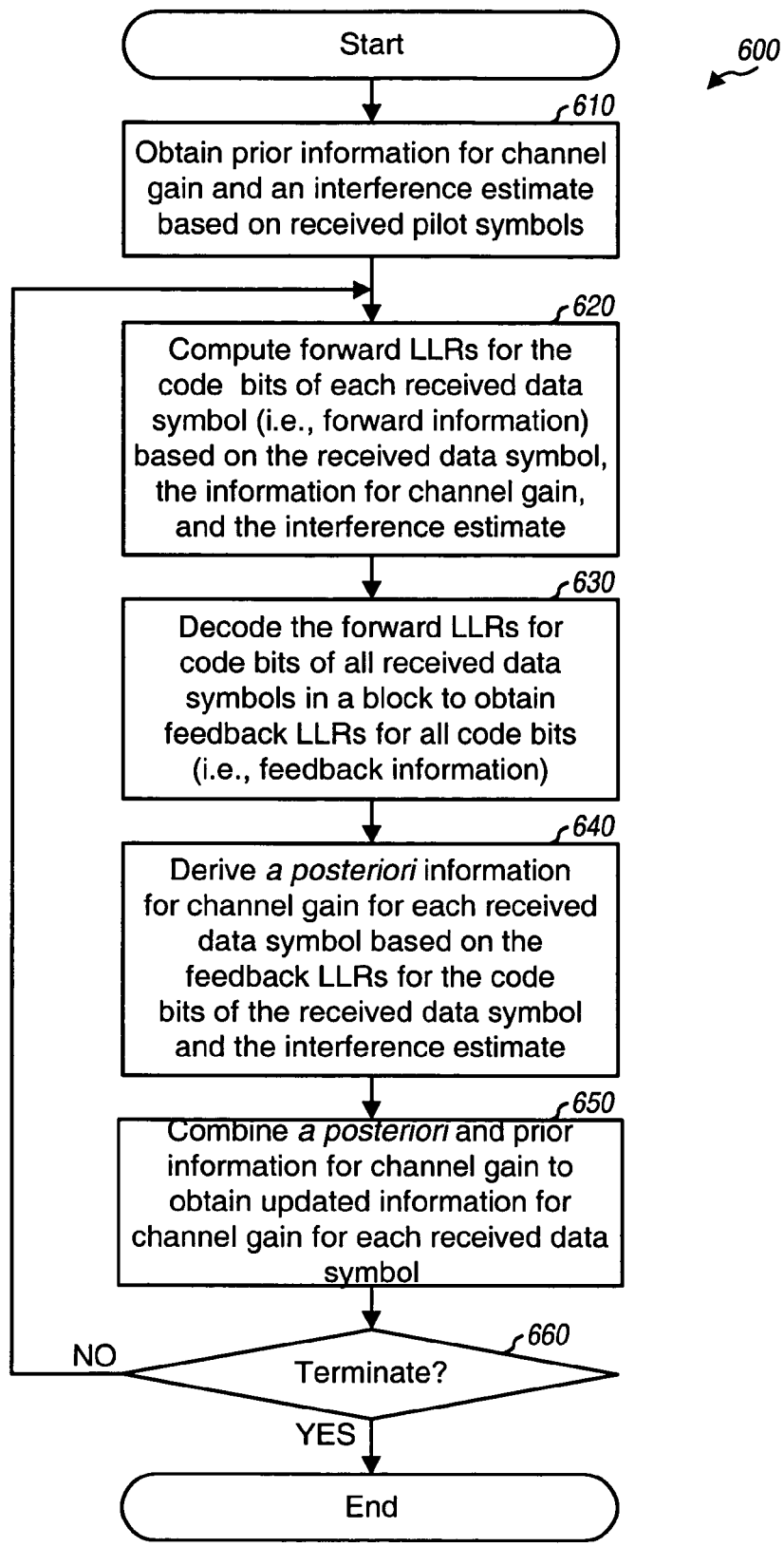
FIG. 6 shows a process for performing iterative channel estimation and decoding with an interference estimate.

FIG. 6 shows a flow diagram of a process 600 for performing iterative channel estimation and decoding with an interference estimate. For process 600, interference is estimated once and used in the iterative channel estimation and decoding process. The interference estimate is not iteratively updated in order to reduce complexity.

Initially, an interference estimate and prior information for channel phase are obtained based on the received pilot symbols (step 610). For step 610, a joint probability distribution on $\theta$ and I is first obtained based on the received pilot symbols, as described above for step 510. The joint distribution on $\theta$ and I is then marginalized into a probability distribution on $\theta$ and a probability distribution on I. A value of I is then selected based on the distribution on I and used as the interference estimate $I_{est}$. The interference estimate $I_{est}$ may be the largest value in the distribution on I, the I value that results in minimum mean square error for the distribution on I, and so on. Step 610 provides a distribution on $\theta$ and the interference estimate $I_{est}$. The distribution on $\theta$, $Pr(\theta=\theta_0|\tilde{p})$, may be expressed as:

$$Pr(\theta=\theta_0|\tilde{p}) \propto Pr(\tilde{p}|\theta=\theta_0, I=I_{est}). \quad \text{Eq(7)}$$

Multiple distributions on $\theta$ may be obtained for multiple received pilot symbols and combined to obtain one distribution on $\theta$ for all received pilot symbols. Equation (7) represents one method of obtaining a distribution on $\theta$. Alternatively, the distribution resulting from marginalization can also be used directly to obtain the distribution on $\theta$.

The forward LLRs for the B code bits of each received data symbol are then computed based on the received data symbol, the prior information for channel phase, and the interference estimate (step 620). Step 620 may be performed in two steps, similar to that described above for step 520 in FIG. 5. In the first step, an a posteriori distribution on x given r, $Pr(x=x_0|r)$, is computed as follows:

$$Pr(x = x_0 \mid r) \propto Pr(r \mid x = x_0) \quad \text{Eq (8)}$$

$$= \sum_{i=1}^{L} Pr(\theta = \theta_i) \cdot Pr(r \mid x = x_0, \theta = \theta_i, I = I_{est}).$$

In the second step, the distribution on x for each received data symbol is marginalized to obtain the forward LLRs for the B codes bits of the received data symbol.

The forward LLRs for all $N_B$ code bits are then decoded to obtain feedback LLRs for the code bits (step 630). A posteriori information for channel phase is then obtained for each received data symbol based on the feedback LLRs for the B code bits of that symbol and the interference estimate (step 640). The a posteriori distribution on $\theta$ for each received data symbol may be expressed as:

$$Pr(\theta = \theta_0 \mid r) \propto Pr(r \mid \theta = \theta_0) \quad \text{Eq (9)}$$

$$= \sum_{i=1}^{M} Pr(x = x_i) \cdot$$

$$Pr(r \mid x = x_i, \theta = \theta_0, I = I_{est}).$$

The a posteriori information for channel phase for the $N_D$ received data symbols and the prior information for channel phase are then combined to obtain updated information for channel phase for each received data symbol (step 650). In particular, an updated distribution on $\theta$ is computed for each received data symbol based on $N_D$-1 a posteriori distributions on $\theta$ for the other $N_D$-1 received data symbols and the prior distribution on $\theta$ derived from the received pilot symbols.

A determination is then made whether or not to terminate the iterative channel estimation and decoding (step 660). If the answer is 'no', then the process returns to step 620 to update the forward LLRs for the B code bits of each received data symbol based on the received data symbol, the updated distribution on $\theta$, and the interference estimate $I_{est}$, as shown in equation (8). Otherwise, the process terminates. Again, step 660 may be performed after step 630.

The iterative channel estimation and decoding with an interference estimate may also be performed in other manners, and this is within the scope of the invention. For example, the iterative process can start by computing a joint probability distribution on $\theta$ and I for each received data symbol with the feedback LLRs for the symbol set to zeros. The received data symbol can provide information about $\theta$ modulo $2\pi/M$ even if no information is available about the transmitted data symbols. This information about $\theta$ modulo $2\pi/M$ can then yield non-trivial information about the interference. The joint probability distributions on $\theta$ and I for the $N_D$ received data symbols are then combined with a prior joint distribution on $\theta$ and I derived from the received pilot symbols. The updated joint distribution on $\theta$ and I for each received data symbol is then marginalized to obtain a distribution on $\theta$ and a distribution on I. A value of I is selected based on the distribution on I and used as the interference estimate $I_{est}$. The distribution on $\theta$ for each received data symbol and the interference estimate $I_{est}$ are then used to compute the forward LLRs for the received data symbol, as described above.

As noted above, one factor that affects the computational complexity of a scheme that iteratively updates channel phase information is the number of values to which the channel phase $\theta$ is quantized (i.e., the value for L). For M-PSK modulation, the channel phase $\theta$ can be estimated to within a range of zero to $2\pi/M$ using non-iterative data-aided estimation. The technique described above for obtaining a distribution on $\theta$ for each received data symbol with the feedback LLRs set to zero is an example of data-aided estimation, which is a non-iterative technique because the code output was not used for estimation. The channel phase can then be quantized to M different values (instead of L values), which can greatly reduce computational complexity if M is much less than L. Various methods may be used to estimate the channel phase based on the received data symbols. Two exemplary methods are described below.

Figure 7A:
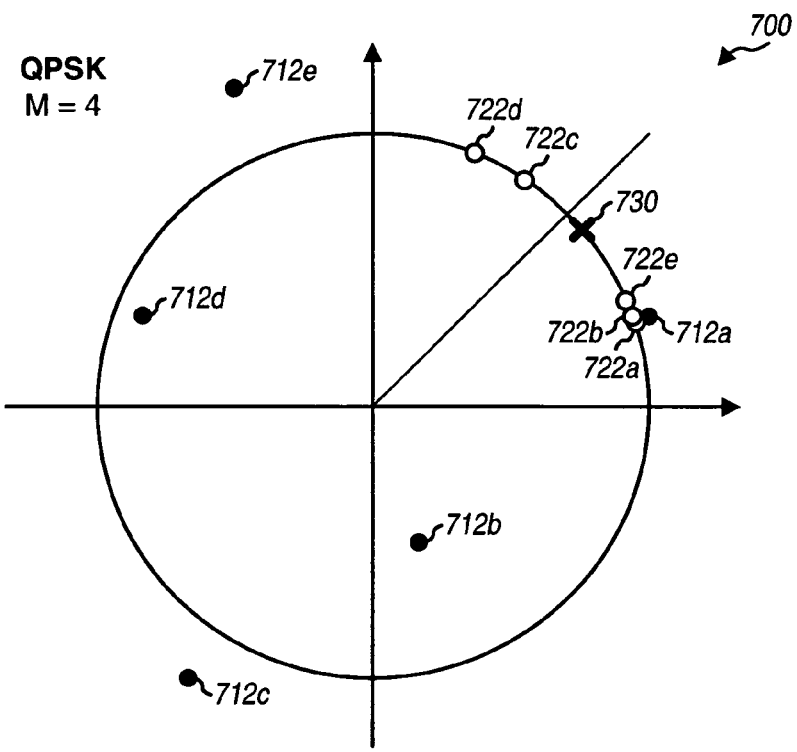
FIGS. 7A and 7B illustrate two methods for estimating channel phase based on received data symbols.

FIG. 7A illustrates the estimation of the channel phase θ based on the phases of the received data symbols. In this example, QPSK modulation is used, and five received data symbols are represented as solid dots 712a through 712e on a QPSK signal constellation 700. Each received data symbol has a phase that is determined by the modulation on the data symbol, the channel phase θ, and noise and interference. For this method, the phase of each received data symbol is first determined. A modulo-$2\pi/M$ operation is then performed on the phase of each received data symbol to effectively remove the modulation on the data symbol and convert the data symbol to a pilot symbol. The phases modulo-$2\pi/M$ for the five received data symbols are plotted as circles 722a through 722e in signal constellation 700. The phases modulo-$2\pi/M$ of the five data symbols are then averaged to obtain a channel phase estimate $\theta_{est}$, which is denoted by a "x" mark 730.

Figure 7B:
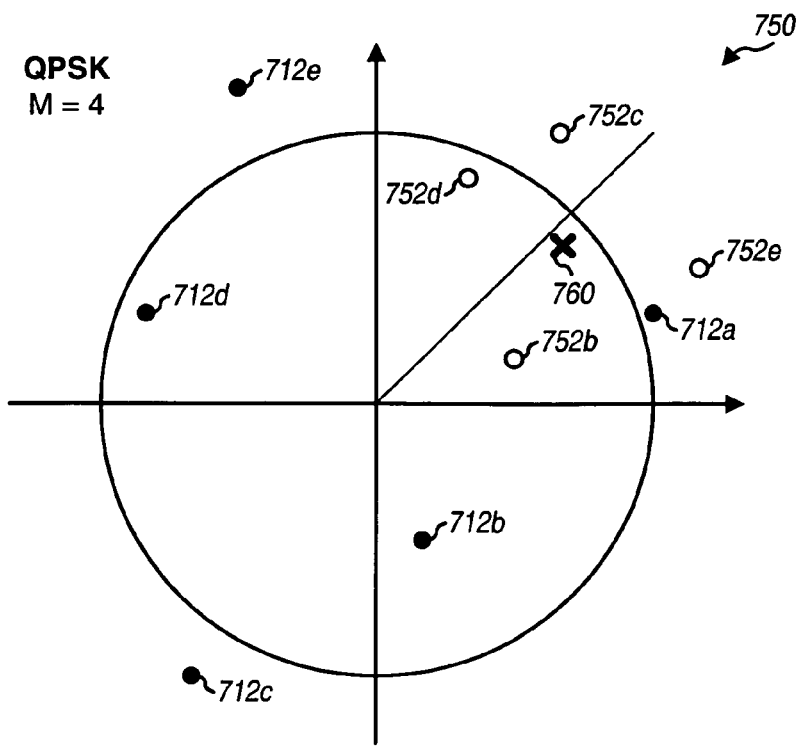

FIG. 7B illustrates the estimation of the channel phase based on the complex values of the received data symbols. For this method, the five received data symbols are also represented as solid dots 712a through 712e on a QPSK signal constellation 750. Each received data symbol is rotated by an integer multiple of $2\pi/M$ (i.e., by $2\pi \cdot i/M$, where i is an integer zero or greater) so that the phase of the rotated received data symbol lies within a range of zero to $2\pi/M$. Received data symbol 712a is rotated by zero degrees. Received data symbols 712b through 712e are rotated by the proper amounts and represented by circles 752b through 752e, respectively, in signal constellation 750. The five rotated received data symbols are averaged to obtain an average received data symbol, which is represented by a "x" mark 760. The channel phase θ is estimated as the phase of the average received data symbol. This method uses both the amplitude and phase of the received data symbols to compute the channel phase estimate $\theta_{est}$, whereas the method illustrated in FIG. 7A uses only the phase of the received data symbols.

The channel phase may also be estimated in other manners, and this is within the scope of the invention. For example, the channel phase may be estimated using the techniques described above for obtaining a distribution on θ for each received data symbol with the feedback LLRs set to zero. As another example, phase of each received data symbol may be multiplied by M and then average.

If the channel phase modulo-$2\pi/M$ can be estimated reliably, then channel phase is known to within a range of zero to $2\pi/M$. The only uncertainty is which one of M possible ranges the channel phase belongs to. An iterative scheme can then operate on M different values for channel phase, i.e., $\{\theta_{est}, \theta_{est}+\theta_M, \theta_{est}+2\theta_M, \ldots \theta_{est}+(M-1)\cdot\theta_M\}$, where $\theta_M=2\pi/M$, instead of L different values, where L is typically much larger than M. A distribution on θ would then contain only M values or components, and a distribution on θ and I would contain only M·Q components. The computations for the forward LLRs and feedback LLRs are greatly simplified because of the fewer number of components to evaluate. For example, if the channel phase is quantized to L=8M values, then the estimation of the channel phase to modulo-$2\pi/M$ reduces the channel estimation complexity by a factor of eight. The estimation of the channel phase (e.g., with received data symbols) may be used for any iterative receiver processing scheme.

Figure 8:
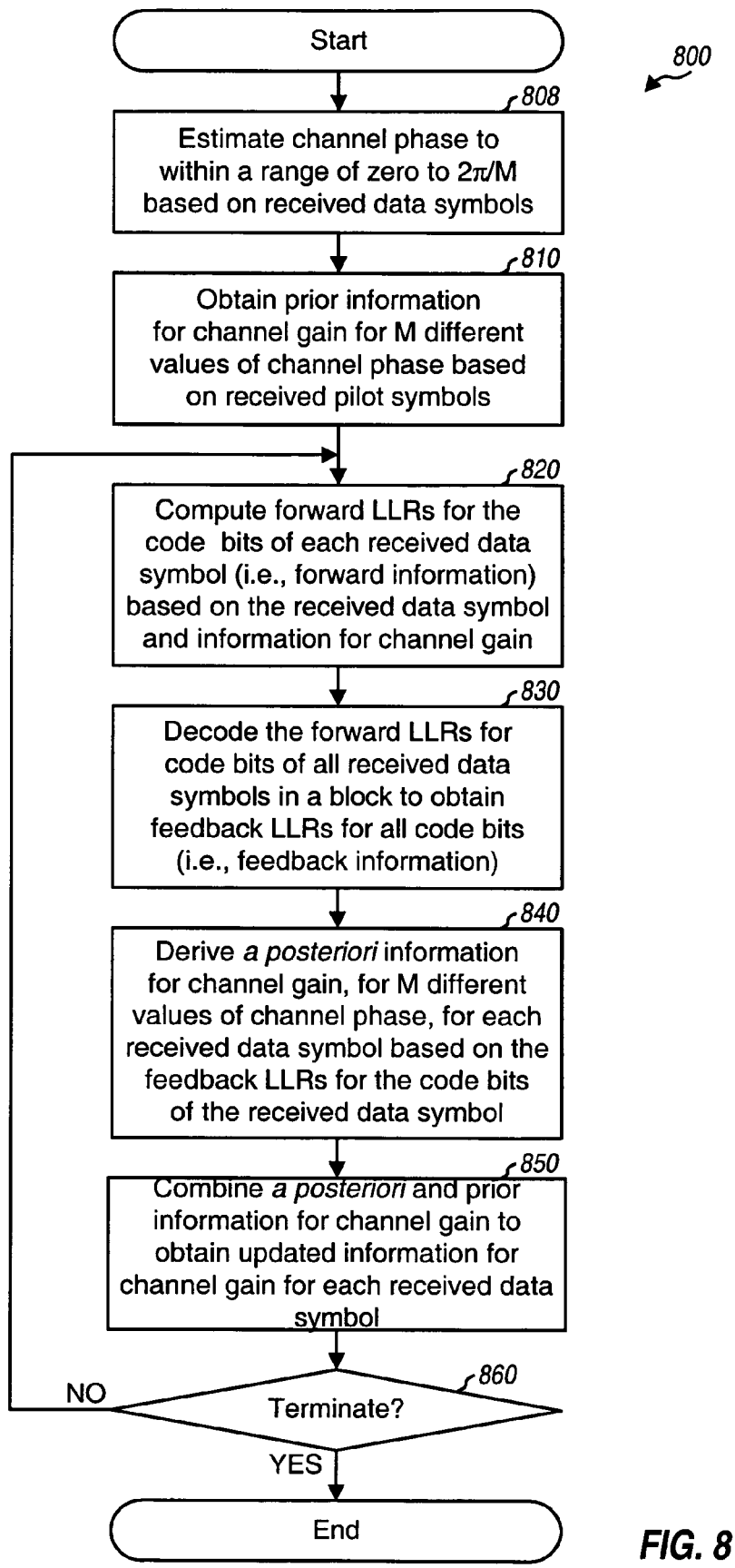
FIG. 8 shows a process for performing iterative channel estimation and decoding with a channel phase estimate obtained from received data symbols.

FIG. 8 shows a flow diagram of a process 800 for performing iterative channel estimation and decoding with a channel phase estimate obtained from received data symbols. For simplicity, process 800 does not account for interference.

Initially, the channel phase θ is estimated to within a range of zero to $2\pi/M$ based on the received data symbols (step 808). Step 808 may be performed with the first or second channel phase estimation method described above and provides the channel phase estimate $\theta_{est}$. Prior information for channel phase is then obtained based on the received pilot symbols for M (instead of L) different values of θ (step 810). Step 810 provides a distribution on θ based on the received pilot symbols for M different values of θ.

The forward LLRs for the B code bits of each received data symbol are then computed based on the received data symbol and the prior information for channel phase (step 820). Step 820 may be performed in similar manner as described above for step 520 in FIG. 5 or step 620 in FIG. 6. The forward LLRs for all $N_B$ code bits are decoded to obtain feedback LLRs for the code bits (step 830). A posteriori information for channel phase is then obtained for each received data symbol based on the feedback LLRs for the B code bits of that symbol and for M different values of θ (step 840). The a posteriori information for channel phase for $N_D$ received data symbols and the prior information for channel phase are combined to obtain updated information for channel phase for each received data symbol, again for M different values of θ (step 850).

A determination is then made whether or not to terminate the iterative channel estimation and decoding (step 860). If the answer is 'no', then the process returns to step 820 to update the forward LLRs for the B code bits of each received data symbol based on the received data symbol and the updated distribution on θ. Otherwise, the process terminates. Again, step 860 may be performed after step 830.

FIGS. 5, 6 and 8 show three specific schemes for performing iterative receiver processing. The scheme in FIG. 5 iteratively updates information for both channel phase and interference, the scheme in FIG. 6 iteratively updates information for channel phase and non-iteratively estimates interference, and the scheme in FIG. 8 iteratively updates information for channel phase and uses phase information obtained from the received data symbols. Various other iterative schemes may also be implemented, and this is within the scope of the invention. For example, information for both channel phase and interference may be iteratively updated for a small number of iterations, and information for only channel phase may be iteratively updated thereafter. As another example, information for channel phase may be obtained once, and information for interference may be iteratively updated. As yet another example, the number of values for channel phase and interference can be reduced in subsequent iterations. As the distribution becomes more compact, some of the points have negligibly low probabilities and can be ignored.

Referring back to FIGS. 3 and 4, the iterative channel and interference estimation and decoding scheme may be viewed as iterating between decoder 340 and an a posteriori probability (APP) detector 360 (with intervening channel deinterleaver 336 and channel interleaver 342). (An APP detector returns a distribution on a bit (i.e., an LLR) whereas a MAP detector returns the most likely value of the bit (i.e., 0 or 1). APP detector 360 uses the feedback information (incoming LLRs) from decoder 340 and the received pilot and data symbols (received values) to obtain the forward information (updated LLRs) for decoder 340. APP detector 360 estimates the channel and interference based on the feedback information and received values, and the channel and interference information is reflected in the forward information provided by APP detector 360 to decoder 340. Other types of detector known in the art may also be used for the APP detector.

In Tanner graph 400, channel and interference estimate node 410, detection nodes 420, and estimation nodes 440 represent one implementation of MAP detector 360. MAP detector 360 may also be implemented in other manners, and this is within the scope of the invention.

Referring back to FIG. 3, RX data processor 330 may implement any receiver processing scheme. For the scheme shown in FIG. 5, estimator 332 performs steps 510, 540 and 550, detector 334 performs step 520, and decoder 340 performs step 530. For the scheme shown in FIG. 6, estimator 332 performs steps 610, 640 and 650, detector 334 performs step 620, and decoder 340 performs step 630. For the scheme shown in FIG. 8, estimator 332 performs steps 808, 810, 840 and 850, detector 334 performs step 820, and decoder 340 performs step 830.

For clarity, the processing by RX data processor 330 for the scheme shown in FIGS. 4 and 5 is described below. Channel and interference estimator 332 implements node 410 and estimation nodes 440a through 440n in FIG. 4. For the first iteration, channel and interference estimator 332 obtains received pilot symbols from OFDM demodulator 320, derives prior information for channel phase and interference based on the received pilot symbols, and provides the prior information to detector 334. For each subsequent iteration, estimator 332 obtains received data symbols from OFDM demodulator 320 and feedback LLRs for the B code bits of each received data symbol from channel interleaver 342, derives a posteriori information for channel gain and interference for each received data symbol, combines the a posteriori information and the prior information, and provides updated information for channel gain and interference for each received data symbol to detector 334.

Detector 334 implements detector nodes 420a through 420n in FIG. 4. Detector 334 obtains the received data symbols from OFDM demodulator 320 and the prior/updated information for channel phase and interference from estimator 332. Detector 334 computes the forward LLRs for the B code bits of each received data symbol based on the prior/updated information and the received data symbol and provides the forward LLRs to channel deinterleaver 336. Channel deinterleaver 336 deinterleaves the forward LLRs. Decoder 340 performs decoding on the deinterleaved forward LLRs and provides feedback LLRs for the B code bits of each received data symbol to channel interleaver 342. Channel interleaver 342 interleaves the feedback LLRs and provides interleaved feedback LLRs to estimator 332.

In the description above, information for channel phase and interference is represented with probability distributions. Furthermore, forward and feedback information is represented with LLRs. Other representations may also be used for channel phase and interference and code bits, and this is within the scope of the invention. For example, log domain representation, inverse probabilities, and so on may be used. The computation for the various steps in FIGS. 5, 6, and 8 is dependent on the particular representations used for the channel phase and interference and code bits.

For clarity, the computation for each of the steps in FIG. 5 is specifically described. Each step may also derive its information in other manners, and this is within the scope of the invention. As an example, for step 510 in FIG. 5, the received pilot symbols may be processed to obtain a pilot estimate, which is indicative of normalized channel observation for the pilot symbols, as shown in equation (2). The pilot estimate may be obtained by (1) multiplying the received pilot symbols with the conjugated pilot symbol to remove pilot modulation and (2) maximally combining all pilot symbols received for the symbol block being recovered. The pilot estimate is then used to obtain a joint probability distribution on $\theta$ and I for the prior information for channel phase and interference.

For simplicity, the description above assumes that the channel magnitude is known by the receiver (i.e., determined by some means) and only the channel phase is estimated iteratively. The channel magnitude may also be estimated iteratively along with the channel phase, albeit with an increase in complexity.

The iterative receiver processing techniques described herein may be used for various wireless communication systems such as an OFDM-based system, a multiple-input multiple-output (MIMO) system, and so on. These techniques may also be used for the downlink (i.e., forward link) and the uplink (i.e., reverse link). For the downlink, transmitter 200 is part of an access point or a base station, and receiver 300 is part of a user terminal or a remote station. For the uplink, transmitter 200 is part of a user terminal, and receiver 300 is part of an access point.

The iterative receiver processing techniques described herein may be implemented by various means. For example, these techniques may be implemented in hardware, software, or a combination thereof. For a hardware implementation, the processing units used to perform iterative receiver processing (e.g., RX data processor 330 in FIG. 3) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the iterative receiver processing techniques may be implemented with modules (e.g., procedures, functions, and so on) that perform the functions described herein. The software codes may be stored in a memory unit (e.g., memory unit 352 in FIG. 3) and executed by a processor (e.g., controller 350). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of recovering data in a wireless communication system, comprising:

obtaining prior information for channel gain and interference;

deriving forward information for code bits corresponding to received data symbols based on the received data symbols and the prior information for channel gain and interference;

decoding the forward information to obtain feedback information for the code bits corresponding to the received data symbols;

deriving a posteriori information for channel gain and interference for each of the received data symbols based on the feedback information for the code bits corresponding to the received data symbol; and combining the a posteriori information for channel gain and interference for the received data symbols and the prior information for channel gain and interference to obtain updated information for channel gain and interference for each of the received data symbols.

2. The method of claim 1, further comprising:
repeating the deriving forward information for at least one additional iteration based on the updated information for channel gain and interference.

3. The method of claim 1, further comprising:
repeating the deriving forward information, decoding the forward information, deriving a posteriori information, and combining the a posteriori information and the prior information for a plurality of iterations, and wherein the forward information is derived based on the prior information for channel gain and interference for first iteration and based on the updated information for channel gain and interference for each subsequent iteration.

4. The method of claim 1, wherein the forward and feedback information for the code bits corresponding to each received data symbol is represented by log-likelihood ratios (LLRs) for the code bits.

5. The method of claim 1, wherein the prior information for channel gain and interference, the a posteriori information for channel gain and interference for each received data symbol, and the updated information for channel gain and interference for each received data symbol are each represented by a joint probability distribution on channel gain and interference.

6. The method of claim 5, wherein each joint probability distribution is quantized to a predetermined number of values to reduce complexity.

7. The method of claim 6, wherein the predetermined number of values are selected based on points with maximum probability in the joint probability distribution.

8. The method of claim 1, wherein the predetermined number of values is reduced for each subsequent iteration of the deriving forward information, decoding the forward information, deriving a posteriori information, and combining the a posteriori information and the prior information.

9. The method of claim 1, wherein the updated information for channel gain and interference for each received data symbol is obtained by combining the prior information for channel gain and interference and the a posteriori information for channel gain and interference for other ones of the received data symbols.

10. The method of claim 1, wherein the prior information for channel gain and interference is obtained based on received pilot symbols.

11. The method of claim 1, wherein the channel gain is composed of channel magnitude and channel phase, wherein the channel magnitude is determined non-iteratively, and wherein prior information, a posteriori information, and updated information are obtained for channel phase and interference.

12. A receiver in a wireless communication system, comprising:
a detector operative to obtain prior information for channel gain and interference and derive forward information for code bits corresponding to received data symbols; and
a decoder operative to decode the forward information and provide feedback information for the code bits corresponding to the received data symbols, and
wherein the detector is further operative to derive updated information including a posteriori information for channel gain and interference using the feedback information, and wherein the detector and the decoder are operative to exchange forward and feedback information for a plurality of iterations.

13. The receiver of claim 12, wherein the detector is an a posteriori probability (APP) detector.

14. The receiver of claim 12, wherein the detector further uses the received data symbols and received pilot symbols to derive the updated information for channel gain and interference.

15. The receiver of claim 12, wherein the forward and feedback information is represented by log-likelihood ratios (LLRs) for the code bits corresponding to the received data symbols.

16. A receiver in a wireless communication system, comprising:
an estimator operative to obtain prior information for channel gain and interference;
a detector operative to derive forward information for code bits corresponding to received data symbols based on the received data symbols and the prior information for channel gain and interference; and
a decoder operative to decode the forward information to obtain feedback information for the code bits corresponding to the received data symbols, and
wherein the estimator is further operative to derive a posteriori information for channel gain and interference for each of the received data symbols based on the feedback information for the code bits corresponding to the received data symbol and to combine the a posteriori information for channel gain and interference for the received data symbols and the prior information for channel gain and interference to obtain updated information for channel gain and interference for each of the received data symbols.

17. The receiver of claim 16, wherein the estimator, detector, and decoder are operative to derive forward information, decode the forward information, derive a posteriori information, and combine the a posteriori information and the prior information for a plurality of iterations, and wherein the detector is operative to derive the forward information based on the prior information for channel gain and interference for first iteration and based on the updated information for channel gain and interference for each subsequent iteration.

18. The receiver of claim 16, wherein the wireless communication system is an orthogonal frequency division multiplexing (OFDM) communication system.

19. The receiver of claim 16, wherein the wireless communication system is a frequency hopping communication system.

20. An apparatus in a wireless communication system, comprising:
means for obtaining prior information for channel gain and interference;
means for deriving forward information for code bits corresponding to received data symbols based on the received data symbols and the prior information for channel gain and interference;
means for decoding the forward information to obtain feedback information for the code bits corresponding to the received data symbols;
means for deriving a posteriori information for channel gain and interference for each of the received data symbols based on the feedback information for the code bits corresponding to the received data symbol; and
means for combining the a posteriori information for channel gain and interference for the received data symbols and the prior information for channel gain and interference to obtain updated information for channel gain and interference for each of the received data symbols.

21. The apparatus of claim 20, further comprising:
means for repeating the deriving forward information, decoding the forward information, deriving a posteriori information, and combining the a posteriori information and the prior information for a plurality of iterations, and wherein the forward information is derived based on the prior information for channel gain and interference for first iteration and based on the updated information for channel gain and interference for each subsequent iteration.

22. A processor readable media for storing instructions operable to:
obtain prior information for channel gain and interference;
derive forward information for code bits corresponding to received data symbols based on the received data symbols and the prior information for channel gain and interference;
decode the forward information to obtain feedback information for the code bits corresponding to the received data symbols;
derive a posteriori information for channel gain and interference for each of the received data symbols based on the feedback information for the code bits corresponding to the received data symbol; and
combine the a posteriori information for channel gain and interference for the received data symbols and the prior information for channel gain and interference to obtain updated information for channel gain and interference for each of the received data symbols.

23. The processor readable media of claim 22, wherein the instructions is further operable to:
repeat derive forward information, decode the forward information, derive a posteriori information, and combine the a posteriori information and the prior information for a plurality of iterations, and wherein the forward information is derived based on the prior information for channel gain and interference for first iteration and based on the updated information for channel gain and interference for each subsequent iteration.

24. A method of recovering data in a wireless communication system, comprising:
obtaining prior information for channel gain and interference based on received pilot symbols;
computing forward log-likelihood ratios (LLRs) for code bits corresponding to received data symbols based on the received data symbols and the prior information for channel gain and interference;
decoding the forward LLRs for the code bits to obtain feedback LLRs for the code bits; deriving a posteriori information for channel gain and interference for each of the received data symbols based on the feedback LLRs for the code bits of the received data symbol; and
combining the a posteriori information for channel gain and interference for the received data symbols and the prior information for channel gain and interference to obtain updated information for channel gain and interference for each of the received data symbols.

25. The method of claim 24, further comprising:
repeating the computing forward LLRs, decoding the forward LLRs, deriving a posteriori information, and combining the a posteriori information and the prior information for a plurality of iterations, and wherein the forward LLRs are computed based on the prior information for channel gain and interference for first iteration and based on the updated information for channel gain and interference for each subsequent iteration.

26. The method of claim 24, wherein the channel gain is composed of channel magnitude and channel phase, wherein the channel magnitude is determined non-iteratively, and wherein prior information, a posteriori information, and updated information are obtained for channel phase and interference.

27. The method of claim 26, wherein the obtaining prior information for channel phase and interference includes
computing a joint probability distribution on channel phase and interference for each of at least one received pilot symbol, and
combining at least one joint probability distribution on channel phase and interference for the at least one received pilot symbol to obtain a composite joint probability distribution on channel phase and interference, wherein the prior information for channel phase and interference comprises the composite joint probability distribution on channel phase and interference.

28. The method of claim 24, wherein the computing forward LLRs for each of the received data symbols includes
computing a probability distribution on data symbol value x based on the received data symbol and a joint probability distribution on channel phase and interference for the received data symbol, and
deriving the forward LLRs for code bits of the received data symbol based on the probability distribution on x.

29. The method of claim 24, wherein the decoding is performed with a maximum a posteriori (MAP) decoder or a soft-output Viterbi (SOV) decoder.

30. The method of claim 24, wherein the decoding is performed with one or more iterations of a Turbo decoder or a low density parity check (LDPC) decoder.

31. A method of recovering data in a wireless communication system, comprising:
obtaining prior information for channel gain;
obtaining an interference estimate;
deriving forward information for code bits corresponding to received data symbols based on the received data symbols, the prior information for channel gain, and the interference estimate;
decoding the forward information to obtain feedback information for the code bits corresponding to the received data symbols;
deriving a posteriori information for channel gain for each of the received data symbols based on the interference estimate and the feedback information for the code bits corresponding to the received data symbol; and
combining the a posteriori information for channel gain for the received data symbols and the prior information for channel gain to obtain updated information for channel gain for each of the received data symbols.

32. The method of claim 31, further comprising:
repeating the deriving forward information, decoding the forward information, deriving a posteriori information, and combining the a posteriori information and the prior information for a plurality of iterations, and wherein the forward information is derived based on the prior information for channel gain for first iteration and based on the updated information for channel gain for each subsequent iteration.

33. The method of claim 31, wherein the forward and feedback information for the code bits corresponding to each received data symbol is represented by log-likelihood ratios (LLRs) for the code bits.

34. The method of claim 31, wherein the prior information for channel gain, the a posteriori information for channel gain for each received data symbol, and the updated information for channel gain for each received data symbol are each represented by a probability distribution on channel gain.

35. The method of claim 31, wherein the prior information for channel gain and the interference estimate are obtained based on received pilot symbols.

36. The method of claim 31, wherein the channel gain is composed of channel magnitude and channel phase, wherein the channel magnitude is determined non-iteratively, and wherein the prior information, the a posteriori information, and the updated information are obtained for channel phase.

37. The method of claim 31, wherein the prior information for channel gain and the interference estimate are obtained by
computing a joint probability distribution on channel phase and interference based on at least one received pilot symbol,
deriving a probability distribution on channel phase and a probability distribution on interference based on the joint probability distribution on channel phase and interference, wherein the prior information for channel phase comprises the probability distribution on channel phase, and
obtaining the interference estimate based on the distribution on interference.

38. A receiver in a wireless communication system, comprising:
an estimator operative to derive prior information for channel gain and an interference estimate;
a detector operative to derive forward information for code bits corresponding to received data symbols based on the received data symbols, the prior information for channel gain, and the interference estimate; and
a decoder operative to decode the forward information to obtain feedback information for the code bits corresponding to the received data symbols, and
wherein the estimator is further operative to derive a posteriori information for channel gain for each of the received data symbols based on the interference estimate and the feedback information for the code bits corresponding to the received data symbol and to combine the a posteriori information for channel gain for the received data symbols and the prior information for channel gain to obtain updated information for channel gain for each of the received data symbols.

39. The receiver of claim 38, wherein the estimator, detector, and decoder are operative to derive forward information, decode the forward information, derive a posteriori information, and combine the a posteriori information and the prior information for a plurality of iterations, and wherein the detector is operative to derive the forward information based on the prior information for channel gain for first iteration and based on the updated information for channel gain for each subsequent iteration.

40. An apparatus in a wireless communication system, comprising:
means for obtaining prior information for channel gain;
means for obtaining an interference estimate;
means for deriving forward information for code bits corresponding to received data symbols based on the received data symbols, the prior information for channel gain, and the interference estimate;
means for decoding the forward information to obtain feedback information for the code bits corresponding to the received data symbols;
means for deriving a posteriori information for channel gain for each of the received data symbols based on the interference estimate and the feedback information for the code bits corresponding to the received data symbol; and
means for combining the a posteriori information for channel gain for the received data symbols and the prior information for channel gain to obtain updated information for channel gain for each of the received data symbols.

41. The apparatus of claim 40, further comprising:
means for repeating the deriving forward information, decoding the forward information, deriving a posteriori information, and combining the a posteriori information and the prior information for a plurality of iterations, and wherein the forward information is derived based on the prior information for channel gain for first iteration and based on the updated information for channel gain for each subsequent iteration.

42. A method of recovering data in a wireless communication system, comprising:
obtaining a channel phase estimate based on received symbols;
obtaining prior information for channel gain based on received pilot symbols and the channel phase estimate;
deriving forward information for code bits corresponding to received data symbols based on the received data symbols and the prior information for channel gain;
decoding the forward information to obtain feedback information for the code bits corresponding to the received data symbols;
deriving a posteriori information for channel gain for each of the received data symbols based on the channel phase estimate and the feedback information for the code bits corresponding to the received data symbol; and
combining the a posteriori information for channel gain for the received data symbols and the prior information for channel gain to obtain updated information for channel gain for each of the received data symbols.

43. The method of claim 42, wherein the channel phase estimate is represented by a set of M hypothesis for channel phase, where M is greater than one.

44. The method of claim 42, further comprising:
repeating the deriving forward information, decoding the forward information, deriving a posteriori information, and combining the a posteriori information and the prior information for a plurality of iterations, and wherein the forward information is derived based on the prior information for channel gain for first iteration and based on the updated information for channel gain for each subsequent iteration.

45. The method of claim 42, wherein the received data symbols are derived from an M-ary phase shift keying (PSK) modulation scheme, where M>2.

46. The method of claim 45, wherein the prior information, the a posteriori information, and the updated information each comprise M components of M different channel phase values.

47. The method of claim 42, wherein the obtaining a channel phase estimate includes
determining phase of each of the received data symbols, rotating the phase of each of the received data symbols, if necessary, to be within a range of values, and
computing the channel phase estimate based on rotated phases for the received data symbols.

48. The method of claim 42, wherein the obtaining a channel phase estimate includes rotating each of the received data symbols, if necessary, so that phase of the rotated received data symbol is within a range of values, computing an average received data symbol based on the rotated received data symbols, and computing the channel phase estimate based on the average received data symbol.

49. A receiver in a wireless communication system, comprising:

an estimator operative to obtain a channel phase estimate based on received data symbols and to obtain prior information for channel gain based on received pilot symbols and the channel phase estimate;

a detector operative to derive forward information for code bits corresponding to received data symbols based on the received data symbols and the prior information for channel gain; and a decoder operative to decode the forward information to obtain feedback information for the code bits corresponding to the received data symbols, and wherein the estimator is further operative to derive a posteriori information for channel gain based on the channel phase estimate and the feedback information for the code bits corresponding to the received data symbols and to combine the a posteriori information for channel gain and the prior information for channel gain to obtain updated information for channel gain.

50. An apparatus in a wireless communication system, comprising:

means for obtaining a channel phase estimate based on received data symbols;

means for obtaining prior information for channel gain based on received pilot symbols and the channel phase estimate;

means for deriving forward information for code bits corresponding to received data symbols based on the received data symbols and the prior information for channel gain;

means for decoding the forward information to obtain feedback information for the code bits corresponding to the received data symbols;

means for deriving a posteriori information for channel gain based on the channel phase estimate and the feedback information for the code bits corresponding to the received data symbols; and means for combining the a posteriori information for channel gain and the prior information for channel gain to obtain updated information for channel gain.

* * * * *

UNITED STATES PATENT AND TRADEMARK OFFICE
CERTIFICATE OF CORRECTION

PATENT NO. : 7,421,041 B2 Page 1 of 1
APPLICATION NO. : 10/791342
DATED : September 2, 2008
INVENTOR(S) : Aamod Khandekar, Avneesh Agrawal and Fuyun Ling It is certified that error appears in the above-identified patent and that said Letters Patent is hereby corrected as shown below:

In column 19, Claim 23, line 33, "instructions is further", should read, --instructions are further--

In column 20, Claim 27, line 10, "includes", should be, --includes:--

In column 20, Claim 28, line 22, "includes", should be, --includes:--

In column 21, Claim 37, line 15, "obtained by", should be, --obtained by:--

In column 22, Claim 47, line 60, "includes", should be, --includes:--

In column 22, Claim 48, line 66, "includes", should be, --includes:--

Signed and Sealed this

Thirtieth Day of March, 2010

David J. Kappos
*Director of the United States Patent and Trademark Office*